United States Patent [19]
Petisce

[11] Patent Number: 5,933,559
[45] Date of Patent: Aug. 3, 1999

[54] RADIATION-CURABLE CROSS-LINKED RIBBON MATRIX MATERIAL FOR BONDING AN ARRAY OF COATED OPTICAL GLASS FIBERS

[75] Inventor: James R. Petisce, Elgin, Ill.

[73] Assignee: DSM N.V., Heerlen, Netherlands

[21] Appl. No.: 09/010,679

[22] Filed: Jan. 22, 1998

Related U.S. Application Data

[63] Continuation-in-part of application No. 08/685,033, Jul. 22, 1996, abandoned.

[51] Int. Cl.[6] .................................................. G02B 6/44
[52] U.S. Cl. .......................... 385/114; 385/106; 385/128; 385/141; 428/383; 428/375
[58] Field of Search ..................................... 385/114, 115, 385/123, 126, 128, 141, 102, 106; 428/375, 383; 522/13, 16, 14; 521/113; 427/500, 503, 514, 515, 517

[56] References Cited

U.S. PATENT DOCUMENTS

| | | | |
|---|---|---|---|
| 4,507,407 | 3/1985 | Kluger | 521/113 |
| 4,601,725 | 7/1986 | Keller | 534/729 |
| 4,751,254 | 6/1988 | Kluger | 521/153 |
| 4,775,748 | 10/1988 | Kluger | 534/729 |
| 4,912,203 | 3/1990 | Kluger | 534/729 |
| 4,985,546 | 1/1991 | Miley | 534/729 |
| 5,074,643 | 12/1991 | Petisce | 385/128 |
| 5,135,972 | 8/1992 | Kluger | 524/88 |
| 5,149,800 | 9/1992 | Kluger | 540/123 |
| 5,302,627 | 4/1994 | Field | 522/13 |
| 5,402,516 | 3/1995 | Blyler, Jr. et al. | 385/141 |
| 5,761,363 | 6/1998 | Mills | 385/114 |
| 5,845,034 | 12/1998 | Petisce | 385/128 |
| 5,881,194 | 3/1999 | Duecker | 385/115 |

FOREIGN PATENT DOCUMENTS

| | | |
|---|---|---|
| 0 390 415 | 10/1990 | European Pat. Off. . |
| 0 432 931 | 6/1991 | European Pat. Off. . |
| 1-204902 | 8/1989 | Japan . |

OTHER PUBLICATIONS

G.A. George, et al.; *Characterization of the Cure of TGDDM/DDS Epoxy Resins by Chemiluminescence I. Spectral and Thermal Analysis*; Journal of Applied Polymer Science, 1987; vol. 33, 2281–2292.

*Primary Examiner*—Hemang Sanghavi
*Attorney, Agent, or Firm*—Pillsbury Madison & Sutro Intellectual Property Group

[57] ABSTRACT

A radiation-curable, cross-linked ribbon matrix material is suitable for covering an array of coated optical glass fibers. The matrix material contains at least one radiation-curable oligomer or monomer, and at least one chromophoric indicator selected so as to be susceptible to destruction of its chromophoric characteristic upon exposure to radiation and present in an amount which becomes substantially colorless when exposed to a level of radiation sufficient to cure the radiation-curable matrix material, wherein the at least one chromophoric indicator has a color that is distinguishable from a base color of the radiation-curable, optical glass fiber coating composition in cured form. A cable structure and a telecommunications system are also described.

19 Claims, 4 Drawing Sheets

RADIATION-CURABLE CROSS-LINKED RIBBON MATRIX MATERIAL FOR BONDING AN ARRAY OF COATED OPTICAL GLASS FIBERS

CROSS REFERENCE TO RELATED APPLICATIONS

This application is a continuation-in-part of Ser. No. 08/685,033, filed Jul. 22, 1996.

FIELD OF THE INVENTION

This invention relates to radiation-curable, optical glass fiber ribbon matrix material for bonding an array of optical glass fibers and to a method of controlling the cure thereof. More particularly the invention provides a ribbon matrix material having an effective amount of a chromophoric indicator component which will normally provide a visible color to the uncured composition but which will becomes colorless at the level of radiation for the desired cure of the coating composition.

BACKGROUND OF THE INVENTION

Optical glass fibers are generally coated with two superposed radiation-cured coatings, which together form a primary coating. The coating which is in direct contact with the glass is called the inner primary coating and the overlaying coating is called the outer primary coating. A plurality of these coated optical glass fibers may be assembled together and bonded with matrix material to form a ribbon of parallel coplanar coated optical fibers. Such a ribbon may typically contain 12 coplanar optical fibers, but other numbers of fibers may be used to form a ribbon. The fibers may also be bundled into a circular or other shape of array forming a cylindrical or other shape of structure having an outer coating of ribbon matrix material.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating, which is on the exposed surface of the coated fiber, is typically a relatively harder coating designed to provide a desired resistance to physical handling forces, such as those encountered when the fiber is cabled.

Such primary coating systems are typically prepared from radiation-curable, optical glass fiber coating compositions (hereinafter referred to as "radiation-curable composition"). It is a characteristic of such systems that the curing proceeds upon exposure to a radiation source, typically a UV-radiation source, for a time sufficient to provide a full cure of the coating compositions at the level of intensity of such source.

As the demand for coated optical glass fibers has increased, manufacturers must respond by adding more fiber drawing production lines and by attempting to increase the linear line speeds of the existing fiber drawing production lines. In the latter case, one factor which will determine the upper limit for the line speed will be the curing rate characteristics of the radiation-curable compositions, including the ribbon matrix material, for a given radiation source and intensity.

If the line speed is increased to the extent that sufficient cure time for the radiation-curable composition, including the ribbon matrix material, is not provided, the radiation-curable composition will not have received a sufficient amount of radiation for complete cure, or cross-linking, of the radiation-curable composition. The production linear line speed is generally inversely related to the amount of radiation striking the optical glass fiber. That is, as the production line speed is increased the amount of radiation exposure to the radiation-curable composition during the production process will necessarily decrease for a given radiation source. Incomplete cure of the radiation-curable composition is undesirable and must be avoided because then the desired protective properties of the incompletely cured primary coating may not be achieved and/or the incompletely cured primary coating may retain tackiness (giving problems in subsequent handling) or a malodorous odor may be present, and there may also be an increase in the extractables (undesirable) in the supposedly-cured coating.

Ribbon production as well as fiber production is therefore confronted with the problem that increases in production line speed are difficult to achieve without jeopardizing the cured coating quality.

If the production line speed is increased without careful consideration and balancing of the associated reduction in radiation exposure, then the radiation-curable composition may be processed at a radiation exposure level less than required for the desired level of curing, which means that the cured primary coating or the ribbon matrix material may not be fully cured. However, if the line speed is conservatively adjusted downwards to ensure that an adequate cure is achieved, this means that the line production is correspondingly reduced at the expense of product throughput.

Because the amount of radiation exposure is equal to the radiation intensity multiplied by the exposure time, the desired or required production line speed could be achieved by increasing the radiation intensity. This would require larger radiation units, which could lead to problems and costs in designing and operating the production line. Even though adjustments in the radiation intensity or exposure can be made, there remain certain fundamental practical issues associated with a radiation curing lamp assembly which can affect the actual amount of radiation reaching a radiation-curable composition, such as a ribbon matrix material.

Specifically, the amount of radiation striking the radiation-curable composition from, for instance, a UV-curing lamp system on a ribbon production line is not constant over the operative lifetime of the lamp and may be considered to be determined by the sum of the following:

(1) reflectivity of lamp reflector system, (2) intensity of curing lamp output, and (3) surrounding enclosure of radiation-curable material.

The reflector system's ability to reflect the radiation can vary during production runs due to:

(1a) variability of reflector cleanliness, (1b) misalignment of reflector system with radiation-curable composition, (1c) solarization of the reflector system, (1d) the age of the lamp and system itself.

The radiation curing UV lamp output typically changes in intensity as the bulb ages in use. Moreover, the wavelength distribution of lamp emission can change as a result of its aging during such use.

When curing radiation-curable compositions such as ribbon matrix material, an elliptical reflector system containing a UV curing lamp is usually used. Such a system is shown in FIG. 1, (Prior Art).

Figure 1:
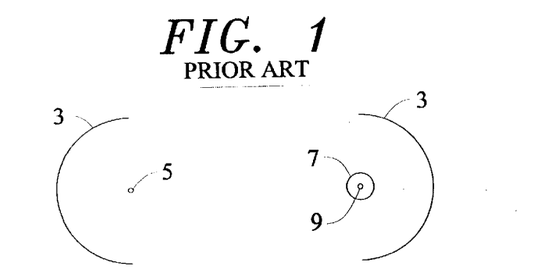
FIG. 1 (Prior Art) illustrates a schematic diagram of a conventional elliptical reflector system containing a UV curing lamp.

As shown in FIG. 1, the UV lamp shown at 5 is positioned at one focal point of the elliptical reflector system shown at 3. A clear center tube shown at 7 is positioned around the other focal point of the reflector system shown at 3. The optical glass fiber or ribbon shown at 9, having a liquid radiation-curable composition thereon, passes through the center tube 7. The clear center tube 7 is also flushed with an inert atmosphere such as nitrogen or argon gas to reduce the oxygen inhibition of polymerization. The clear center tube 7 also provides protection of the elliptical reflector system from contamination by the liquid coating as it is applied to the ribbon of optical fibers, e.g. by splattering.

During the radiation curing production process, the inner surface of the clear center tube 7 may, over time, become contaminated with some of ribbon matrix material or its components. This contamination has the effect of thereby decreasing the amount of radiation which reaches the uncured coating on the ribbon array of optical glass fibers 9 after passage through the center tube 7.

Thus, there is a need for some means to monitor and determine the level of cure of the ribbon matrix material during the prolonged operation of the coating line. Since, once installed, the line apparatus and its radiation source are not readily changed except by expensive shut-down of the (generally continuously operating) line itself, the amount of radiation actually striking the radiation-curable ribbon matrix material present on the array of optical glass fibers will necessarily vary, depending on the condition at any given point in time as a result of the above-described problems presented by the reflector system, lamp output, contaminated center tubes.

It is accordingly difficult to confidently meet the demand for increased production line speeds while maintaining conditions which will assuredly provide optimum complete cure of the coating. At the present time, testing of the completeness of the ribbon matrix material cure is commonly done by off-line physical tests on specimens of the ribbon after it has been produced.

What would be desirable is a system which would permit real time determination of the ribbon matrix cure level by indicator means. Knowing whether or not the required complete cure is achieved under the operating conditions will then inform the line operator of the need to make adjustments to line speed, lamp intensity (if possible) or replacement, or equipment cleaning, while not jeopardizing wasted production due to an inadequate coating cure.

There has been no effective solution to the above described problems for the glass fiber ribbon technology, until the present invention.

U.S. Pat. No. 5,302,627 is directed to the fabrication of printed circuit boards and similar electrical or electronic devices. This patent discloses a method for indicating a cure point of an ultraviolet radiation curable composition used with such devices. It does not disclose any use of the compositions as coatings for or ribbons for an array of optical glass fibers. Nor does it address the special problems of high speed continuously-operated glass fiber ribbon forming lines and the very critical requirements thereof. However, no definition of the cure point is provided. Furthermore, while this patent discloses that a dye can be used which becomes colorless upon exposure to ultraviolet radiation, no examples of such dyes are provided. All of the examples merely changed color upon exposure to ultraviolet radiation. This patent only teaches that the amount of dye used should be such that it does not inhibit the curing of the composition. One skilled in the art reading and comprehending this patent would not know how to prepare a radiation-curable composition which will provide instant real time visible feedback that the amount of radiation exposed to the radiation-curable composition is or is not sufficient to cure the radiation-curable composition to the desired level.

Published Japanese Patent Application No. 1-204902 is directed to molding materials, paints and adhesives. This patent discloses a photosetting resin composition containing a photo-coloring compound which changes color upon exposure to light for finding the state of curing of the composition. It does not disclose any use of the compositions as coatings for optical glass fibers or as ribbon matrix material for arrays of fibers. Nor does it address the special problems of high speed continuously-operated glass fiber ribbon matrix forming lines and the very critical requirements for such production lines. While this patent discloses that a dye can be used which becomes colorless upon exposure to ultraviolet radiation, no examples of such dyes are provided. All of the examples merely changed color upon exposure to ultraviolet radiation. This patent only teaches that the amount of dye used should be 0.5 to 10 parts by weight. One skilled in the art reading and comprehending this patent would not know how to prepare a radiation-curable composition which will provide instant real time visible feedback that the amount of radiation exposed to the radiation-curable composition is or is not sufficient to cure the radiation-curable composition to the desired level.

A process and apparatus for producing a bonded ribbon of coated fibers is described in U.S. Pat. Nos. 5,037,763 and 4,900,126, the entire disclosures of which patents are incorporated herein by reference.

SUMMARY OF THE INVENTION

This application is a continuation-in-part of Ser. No. 08/685,033, filed Jul. 22, 1996, the entire disclosure thereof being incorporated herein by reference.

In view of the above described problems, an objective of the present invention is to provide a simple and effective real-time means to determine whether a radiation-curable ribbon matrix material applied to an array of optical glass fibers has been exposed to the required amount of radiation sufficient to reach the necessary level of cure.

The array may be a ribbon or a bundle of coated optical fibers. A typical ribbon may be formed from a row of 12 or 16 fibers. A typical bundle may be a substantially circular array having a central fiber surrounded by a plurality of further fibers. Alternatively, the bundle may have other appropriate cross-sectional shapes such as square, trapezoid, etc. The terms "ribbon" and "bundle" as used herein are interchangeable and non-limiting.

More particularly, this invention provides a technique whereby the optical glass fiber ribbon matrix material is provided with a chromophoric component which has the property of losing its visible light chromophoric functionality upon exposure to UV actinic radiation and does so at a minimal concentration level such as to coincide with the level of radiation exposure which is required to achieve cure of the ribbon matrix material itself during the operation of the production line. This invention thus requires two balanced selection steps: first, the selection of the suitable chromophoric component, and secondly the selection of the concentration of that component in the ribbon matrix material. At the same time, the desired protective characteristics of the ribbon matrix material itself must not be degraded by addition of the chromophoric entity.

Surprisingly, this objective, and other objectives, are achieved by the following.

The invention provides a radiation-curable, cross-linkable optical glass fiber ribbon matrix material including at least one radiation-curable oligomer or monomer; and at least one chromophoric indicator selected so as to be susceptible to destruction of its chromophoric characteristic upon exposure to actinic radiation and present in an amount which becomes substantially colorless when exposed to a level of radiation sufficient to cure said radiation-curable, optical glass fiber ribbon matrix material wherein said at least one chromophoric indicator has a color which is distinguishable from a base color of said radiation-curable, optical glass fiber ribbon matrix material in cured form.

The invention also provides a method of formulating a radiation-curable ribbon matrix material adapted for use on already coated optical glass fibers so as to provide a visual indication of a desired cure, said method comprising the steps of:

providing a radiation-curable, optical glass fiber ribbon matrix material;

measuring and determining a critical radiation dose level for said radiation-curable, optical glass fiber ribbon matrix material which is the minimum level of radiation sufficient to achieve a desired cure of said radiation-curable, optical glass fiber ribbon matrix material;

selecting a chromophoric indicator having the characteristics of exhibiting a visible color while also having its chromophoric characteristics substantially destroyed upon exposure to actinic radiation;

determining a concentration of a chromophoric indicator that exhibits a substantially colorless characteristic at said critical radiation dose level for curing of said ribbon matrix material; and incorporating at least said concentration of said chromophoric indicator into said uncured radiation-curable, optical glass fiber ribbon matrix material prior to application to a coated optical glass fiber.

The invention further provides a ribbon matrix for coated optical glass fibers comprising:

a plurality of coated optical glass fibers; and at least one radiation-cured ribbon matrix material containing a bleached chromophoric indicator, formulated from a radiation-curable ribbon matrix material having as essential elements:

at least one radiation-curable oligomer or monomer; and at least one chromophoric indicator in an amount which becomes substantially colorless when exposed to an amount of radiation suitable for curing said radiation-curable, ribbon matrix material, wherein said at least one chromophoric indicator has a color which is distinguishable from a base color of said radiation-cured ribbon matrix material.

The invention further provides an optical glass fiber cable structure including:

(1) at least one coated optical glass fiber; and (2) a ribbon matrix material covering the at least one coated optical glass fiber, wherein the ribbon matrix material includes at least one radiation-cured material containing a bleached chromophoric indicator, the at least one radiation-cured matrix material being formulated from a radiation-curable cross-linkable matrix material having as essential elements:

(i) at least one radiation-curable oligomer or monomer; and (ii) at least one chromophoric indicator in an amount which becomes substantially colorless when exposed to an amount of radiation suitable for curing said radiation-curable matrix material, wherein the at least one chromophoric indicator has a color which is distinguishable from a base color of said radiation-cured matrix material.

Also provided is a telecommunications system including: an array of optical glass fibers coated with at least one radiation-cured ribbon matrix material containing a bleached chromophoric indicator, the at least one radiation-cured ribbon matrix material being formulated from a radiation-curable ribbon matrix material having as essential elements:

at least one radiation-curable oligomer or monomer; and at least one chromophoric indicator in an amount which becomes substantially colorless when exposed to an amount of radiation suitable for curing said radiation-curable ribbon matrix material, wherein the at least one chromophoric indicator has a color which is distinguishable from a base color of the radiation-cured ribbon matrix material.

The completeness of the cure of the matrix material can be determined by using an in-line calorimetric method to measure the chromophoric indicator.

DETAILED DESCRIPTION OF PREFERRED EMBODIMENTS

Figure 2:
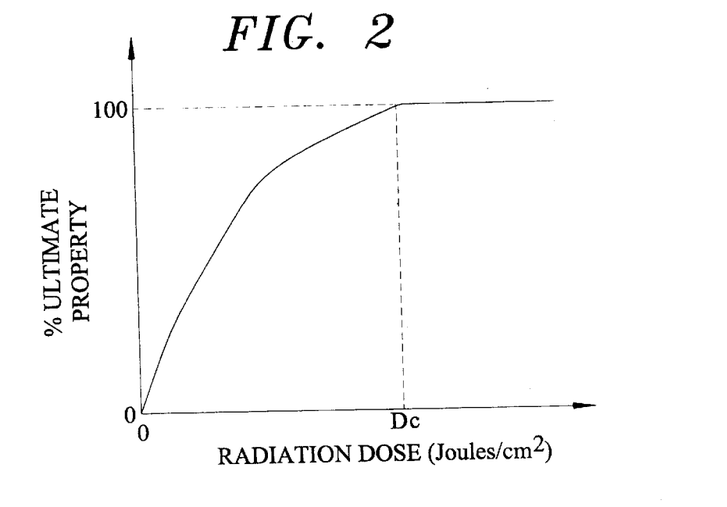
FIG. 2 illustrates a graph of an ultimate property of a ribbon matrix material versus the radiation dose applied to cure the ribbon matrix material.

Radiation-curable compositions usually exhibit the behavior shown in FIG. 2. As shown in FIG. 2, as the amount of radiation to which a radiation-curable composition is exposed is increased, the amount of a specific physical or performance property of the cured material (measured as a percentage of the fully attainable value for the specific composition) correspondingly increases. This increase continues until the ultimate value of the measured physical or performance property is achieved. The ultimate value is defined as the maximum value of a physical or performance property, which cannot be exceeded by further exposure to radiation. Examples of measured physical or performance properties are modulus, glass transition temperature, hardness, surface adhesion, and remaining extractables.

As shown in FIG. 2, once the measured physical property or performance property reaches the ultimate value, further exposure to radiation does not result in an increase in the measured property or performance. The lowest radiation dose which achieves the level of curing sufficient to provide the ultimate value is hereinafter referred to as the critical radiation dose "$D_c$", and can be easily obtained from the graph in FIG. 2. $D_c$ is used herein to represent minimum level of radiation exposure to fully cure the radiation-curable composition. By adjusting the radiation exposure in the fiber ribbon production line closely to the $D_c$, and being able to determine in real time that the Dc is just being maintained to effect the desired full cure, the linear line speed can be maximized without jeopardizing the product quality.

Figure 3:
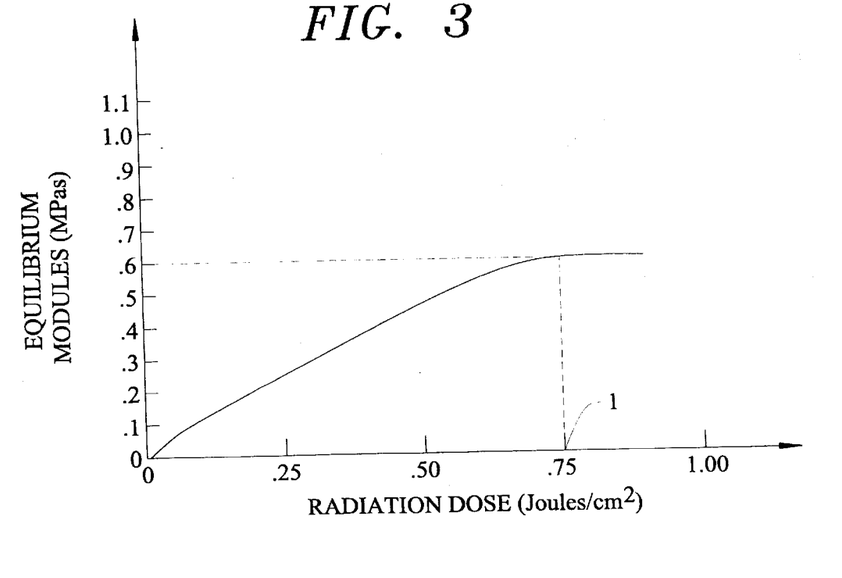
FIG. 3 illustrates a graph of the equilibrium modulus of a radiation-cured ribbon matrix material versus the radiation dose applied to cure the ribbon matrix material.

The following example demonstrates a simple way to determine the $D_c$ required to achieve the ultimate value for the property of equilibrium modulus, according to this invention. FIG. 3 shows the graph of equilibrium modulus (MPas), (megapascals), versus the radiation dose (Joules/$cm^2$).

The ultimate value for the equilibrium modulus of this example material is 0.6 MPas, at a critical radiation dose, $D_c$, of 0.75 Joules/$cm^2$. The $D_c$ can be easily read from the graph in FIG. 3, as shown at 1. The requirement for a production engineer is to produce a fully cured ribbon of an array of optical glass fibers and hence to ensure that the radiation-curable ribbon matrix material is always exposed to a radiation dosage of at least the $D_c$, which here is 0.75 Joules/$cm^2$.

According to this invention, for determination of the level of adequate radiation cure of the radiation-curable ribbon matrix composition, i.e. that it has been exposed to at least the $D_c$ level of radiation, a chromophoric indicator is incorporated into that composition, the indicator having been selected so as to have the characteristic of substantially, and permanently, losing its chromophoric characteristic (at the concentration employed) upon exposure to that $D_c$ radiation level, so as to become essentially colorless in visible light.

The use of such a chromophoric indicator according to the present invention is applicable to all radiation-curable, ribbon matrix material compositions.

Examples of suitable radiation-curable compositions which may be used variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Such radiation-curable compositions contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The radiation-curable compositions may also contain a reactive diluent which is used to adjust the viscosity. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone, and the like.

Another type of reactive diluent that can be used is a compound having an aromatic group. Particular examples of reactive diluents having an aromatic group include: ethyleneglycolphenylether-acrylate, polyethyleneglycolphenyletheracrylate, polypropyleneglycolphenylether-acrylate, and alkyl-substituted phenyl derivatives of the above monomers, such as polyethyleneglycolnonylphenyl-etheracrylate.

The reactive diluent can also comprise a diluent having two or more functional groups capable of polymerization. Particular examples of such monomers include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as
1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:

epoxy-cyclohexane, phenylepoxyethane, 1,2-epoxy-4-vinylcyclohexane, glycidylacrylate, 1,2-epoxy-4-epoxyethyl-cyclohexane, diglycidylether of polyethylene-glycol, diglycidylether of bisphenol-A, and the like.

If the radiation-curable functional group of the radiation-curable monomer or oligomer has an amine-ene or thiol-ene system, examples of reactive diluents having allylic unsaturation that can be used include:

diallylphthalate, triallyltri-mellitate, triallylcyanurate, triallylisocyanurate, and diallylisophthalate.

For amine-ene systems, amine functional diluents that can be used include, for example:

the adduct of trimethylolpropane, isophorondiisocyanate and di(m)ethylethanolamine, the adduct of hexanediol, isophoron-diisocyanate and dipropylethanolamine, and the adduct of trimethylol propane, trimethylhexamethylenediisocyanate and di(m)ethylethanolamine.

Other additives which can be used in the ribbon matrix composition include, but are not limited to, photoinitiators, catalysts, lubricants, wetting agents, release agents, antioxidants and stabilizers. The selection and use of such additives is within the skill of the art.

Generally, according to the present invention, a specific concentration of the chromophoric indicator is incorporated within the desired radiation-curable ribbon matrix material composition. The chromophoric indicator is selected so as to display a color to the human eye prior to exposure to the radiation cure, e.g. a color having a wavelength in the range of about 400 to about 700 nm. During exposure to radiation, the chromophoric indicator changes from colored to substantially colorless, hereinafter referred to as bleaching. The color of the chromophoric indicator must be distinguishable from any desired base color of the cured ribbon matrix material so that a distinct color change can easily be seen prior to exposure of the radiation-curable ribbon matrix composition to the $D_c$ level of radiation.

The concentration of the chromophoric indicator present within the radiation-curable composition can be adjusted so that the bleaching of the chromophoric indicator occurs at a radiation level which is substantially equal to or greater than the critical radiation dose $D_c$ for the radiation-curable composition. Thereby, the disappearance of the visible color serves as an indicator or a complete cure of the radiation-curable composition. Preferably, the concentration of the chromophoric indicator present in the radiation-curable composition is adjusted so that the bleaching of the chromophoric indicator occurs at a radiation level which is substantially equal to the critical radiation dose $D_c$ for the radiation-curable composition.

Based on the disclosure herein, one skilled in the art will easily be able to select and to determine the concentration of chromophoric indicator which becomes substantially colorless at the radiation level "$D_c$" required to fully cure the selected radiation-curable ribbon matrix composition.

Figure 4:
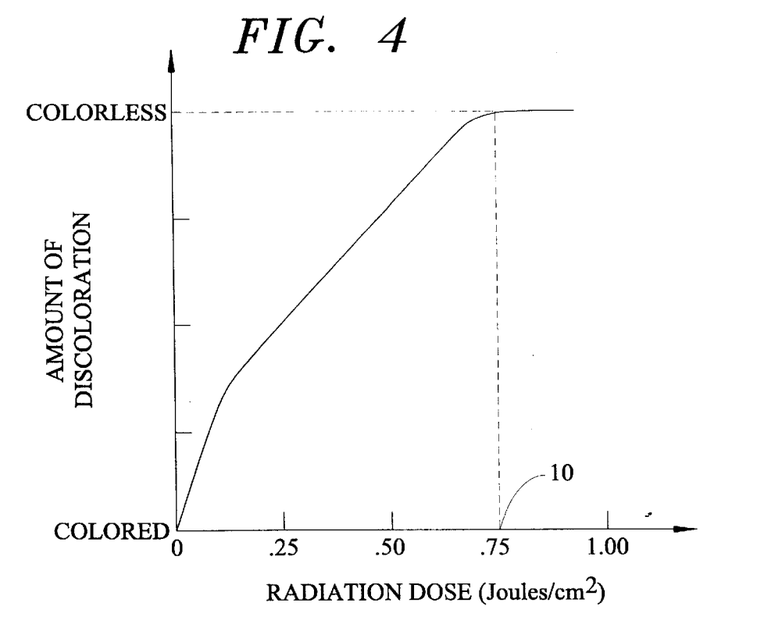
FIG. 4 illustrates a graph of the amount of discoloration of a specific concentration of a chromophoric indicator versus the radiation dose applied to the chromophoric indicator.

For a specific chromophoric indicator at a specific concentration, the amount of bleaching of the chromophoric indicator can be represented by the response curve shown in FIG. 4. This response curve can be easily determined and measured by one skilled in the art by exposing a specific concentration of the chromophoric indicator to varying levels of radiation, measuring the amount of bleaching that has occurred, and then plotting the results. The amount of radiation required to completely bleach the specific concentration of chromophoric indicator can be easily read from the graph, as shown at 10.

Figure 5:
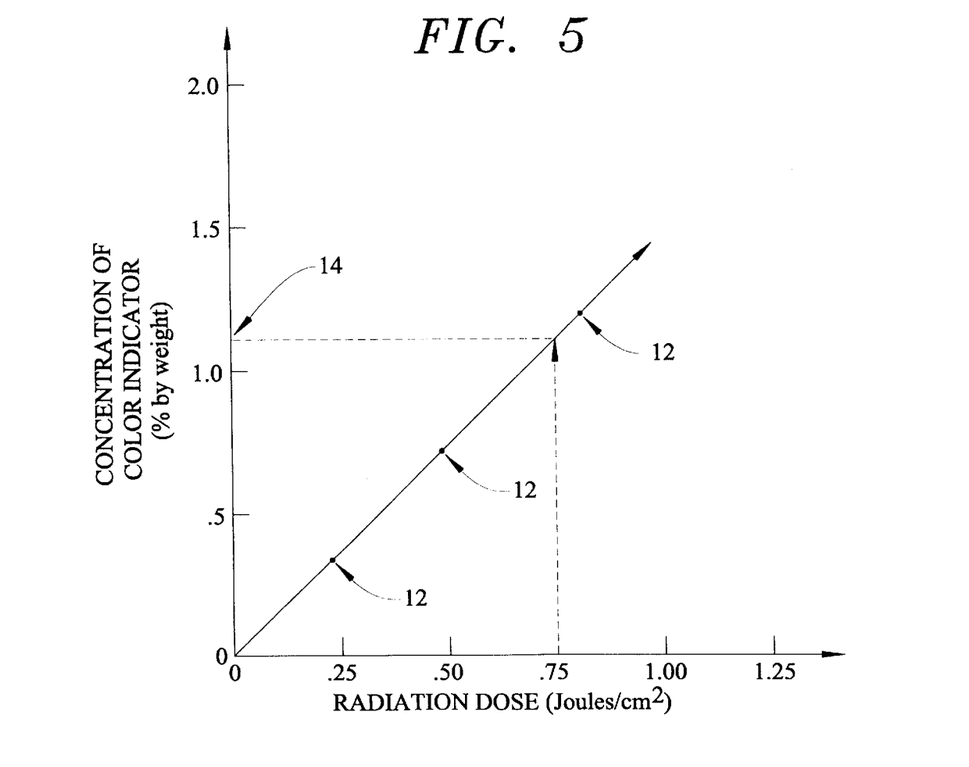
FIG. 5 illustrates a graph of the concentration of a chromophoric indicator versus the radiation dose required to completely bleach the chromophoric indicator.

Generally, an increase in the concentration of the chromophoric indicator will result in an increase in the amount of radiation required to bleach the chromophoric indicator. Different concentrations of the chromophoric indicator can then be tested in the same manner as above to determine the amounts of radiation required to completely bleach the different concentrations. The results can be plotted, as shown in FIG. 5 at number 12, to make a concentration/radiation dose curve. This concentration/radiation dose curve can be used to easily determine the approximate concentration of the chromophoric indicator that will become colorless at the selected radiation dose level. For example, if the critical radiation dose $D_c$ of the radiation curable composition is 0.75 Joules/cm$^2$, the dose response curve can be used as shown by the dotted line to determine the concentration of chromophoric indicator that will become colorless at this radiation dose level, shown at 14 in FIG. 5. For this specific example, that concentration of the chromophoric indicator is about 1.25% by weight. The same type of radiation that will be used to cure the radiation-curable ribbon matrix material should be used to determine the concentration/radiation dose curve.

The required amount of radiation to bleach the specific concentration of the chromophoric indicator in the radiation-curable composition may vary from the estimate provided by the concentration/radiation dose curve due to effects from the components in the radiation-curable composition. Therefore, the final concentration of the chromophoric indicator should be experimentally fine-tuned by measuring the amount of radiation required to bleach the chromophoric indicator in the desired radiation-curable composition and then increasing the concentration of the chromophoric indicator if the bleaching occurs at too low of a radiation dose or decreasing the concentration of the chromophoric indicator if the bleaching occurs at too high of a radiation dose.

Suitable amounts of the chromophoric indicator have been found to be between about 0.05 and about 5% by weight of the total radiation-curable ribbon material composition. Preferably, the amount of chromophoric indicator is between about 0.1 and about 2% by weight.

The chromophoric indicator can be any dye or pigment which bleaches or becomes colorless when exposed to radiation, in particular the type of radiation used to cure the radiation-curable ribbon matrix composition. For example, the chromophoric indicator can be an organic dye which becomes colorless upon exposure to UV radiation.

Preferably, the chromophoric indicator is a polymeric dye. The term polymeric dye is used herein to represent those dyes having a polymeric (polyol) backbone into which at least one chromophoric molecular entity has been chemically incorporated. The polymeric dye preferably has molecular weight between about 1000 to about 2500, and more preferably about 1200 to about 2200.

Examples of suitable polymeric dyes are disclosed in U.S. Pat. No. 4,507,407, the complete disclosure of which is incorporated herein by reference.

Commercial examples of suitable polymeric dyes presently include:

Reactint Blue X3LV;

Reactint Blue X17AB;
Reactint Orange X38;
Reactint Red X64;
Reactint Violet X80LT; and
Reactint Yellow X15, available from Milliken Chemicals.

An advantage of using a polymeric dye is that the backbone can either become entangled within, or reacted with, the cross-linked ribbon matrix material composition. This significantly reduces or eliminates the possibility that the chromophoric indicator would contribute to cured material volatiles.

The polymeric dye can be easily modified by incorporating into the polymeric backbone at least one functional group capable of polymerization exposed to radiation. The radiation-curable functional group can be any one of those described herein above. In this manner, the polymeric dye can be cross-linked with the radiation-curable oligomers and monomers present in the coating composition upon exposure to radiation.

Figures 6, 7:
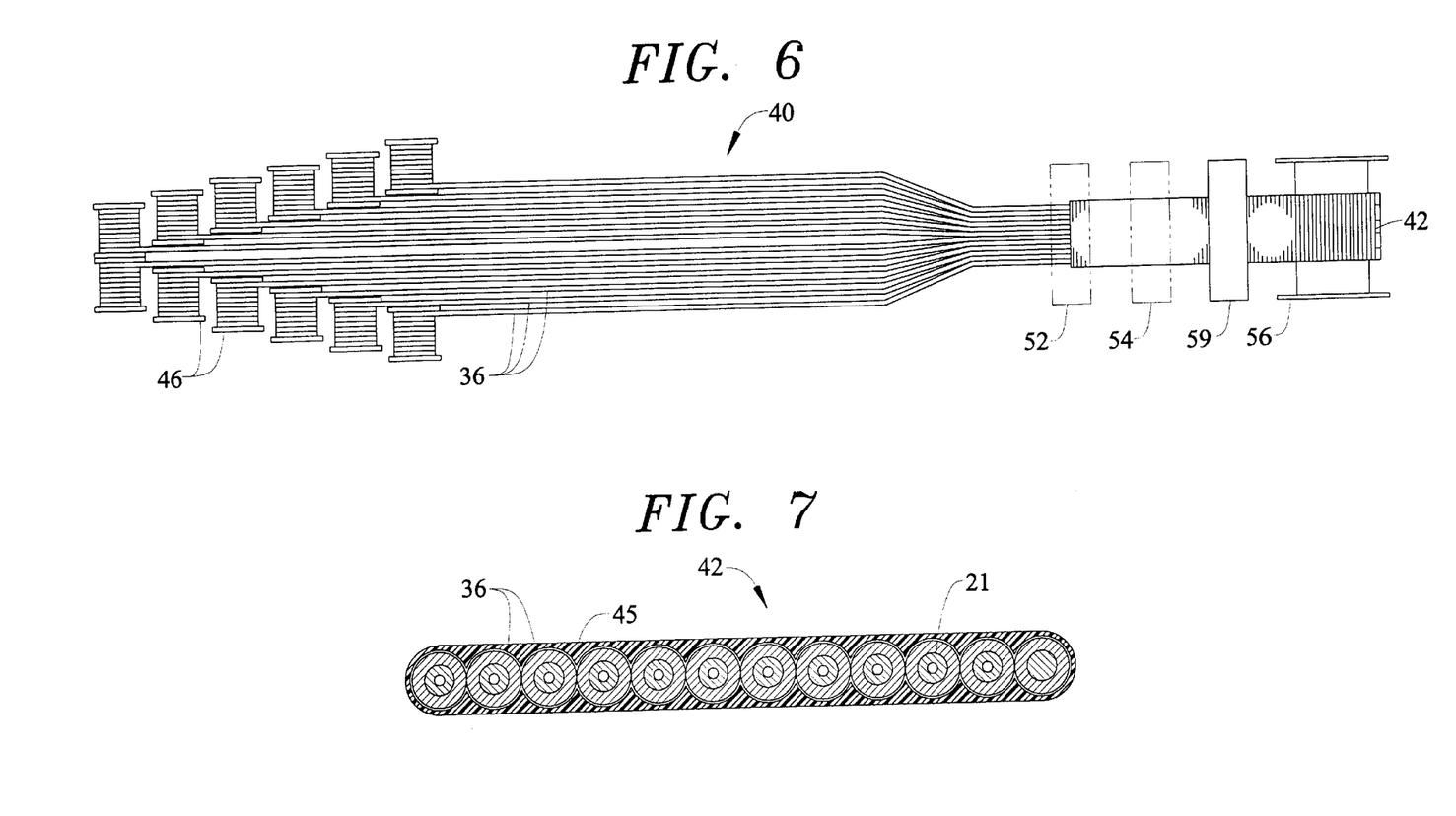
FIG. 6 illustrates a schematic diagram of a production line for making an assembly of coated optical glass fibers formed into an array and coated with ribbon matrix material.
FIG. 7 illustrates, an end sectional view of a ribbon assembly of the invention.

FIG. 6 shows schematically, the production of a ribbon assembly 42 of an array of coated optical fibers 40. Bonded ribbon 42 includes a plurality of coated optical fibers 36 each having a core, a cladding, and one or more layers fed from fiber suppliers 46. A planar array of optical fibers 36 is embedded in radiation-curable matrix material by application of the matrix material in liquid form using applicator 52, for example, a coating die. The material is then directed past radiation curing apparatus 54, such as the apparatus shown in FIG. 1 herein, for curing the matrix material. The cured, bonded ribbon 42 then passes an in-line cure detection system 59 before being taken up on winding spool 56. In-line detection system 59 includes a color detection system for determining whether sufficient color shift of the chromophoric indicator has taken place, i.e., for determining calorimetrically whether cure of the matrix material is complete. This determination and corresponding in-line ability to monitor that cure is complete greatly reduces wastage of ribbon assemblies that include coated optical fibers. Details of methods for bonding optical fibers into a ribbon or other assembly are found in U.S. Pat. Nos. 5,037,763 and 4,900,126, the disclosures of which are incorporated herein by reference.

The optical fiber ribbon may be visually inspected in-line at location 59, shown in FIG. 6, to determine whether the ribbon matrix material has been completely cured. A suitable wave-length sensitive calorimetric device may be used at this point. If the color of the cured ribbon matrix material containing the chromophoric indicator is the same as the base color (without chromophoric indicator) of a fully cured ribbon matrix material, then the ribbon matrix material has been exposed to sufficient actinic radiation to provide a complete cure.

Alternatively, the optical fiber ribbon may be visually inspected at winding spool 56, shown in FIG. 6, to determine whether the ribbon matrix material has been completely cured. If the color of the cured ribbon matrix material containing a chromophoric indicator is the same as the base color (without chromophoric indicator) of a fully cured ribbon matrix material, then the ribbon matrix material has been exposed to sufficient actinic radiation to provide a complete cure.

Figure 8:
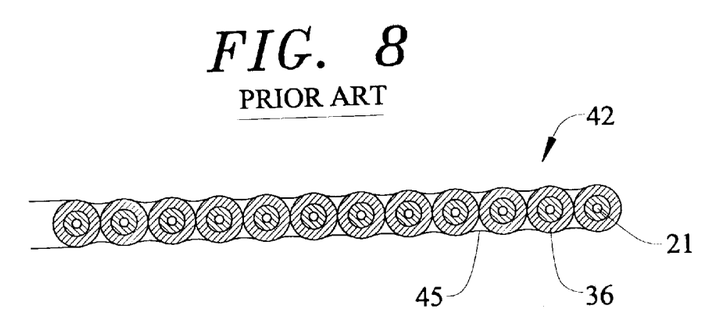
FIG. 8 illustrates an end sectional view of another ribbon assembly of the invention.
Figure 9:
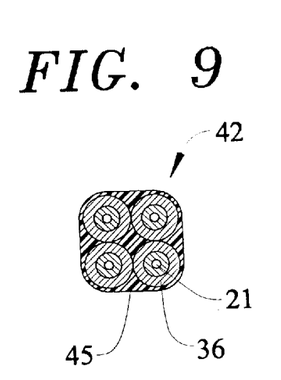
FIGS. 9–11 illustrate end sectional views of further ribbon assemblies of the invention.
Figure 10:
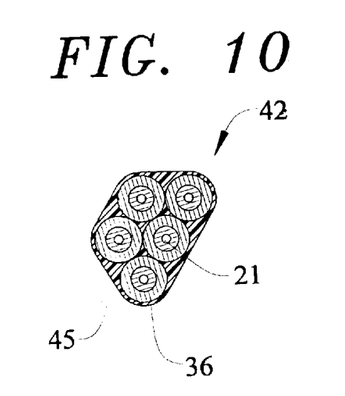
Figure 11:
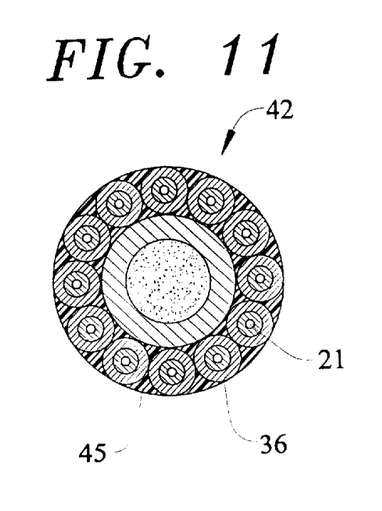

FIGS. 7–11, in which like numerals represent like parts, illustrate various ribbon assemblies that can be formed using ribbon matrix material according to the invention. Ribbon assembly 42 shown in each of FIGS. 7–11 is formed of an array of individual optical fibers 21 each surrounded by at least one coating 36, the array of optical fibers being joined together into a ribbon by ribbon matrix material 45. FIG. 7 shows a ribbon assembly. FIG. 8 shows edge bonding of the coated fibers forming the ribbon assembly. FIGS. 9–11 show arrays of optical fibers respectively having substantially rectilinear, trapezoid and circular cross-sectional shapes.

The figures illustrate non-limiting examples of assemblies of bonded fibers. The ribbon matrix material may be of lesser thickness than the outer diameter of the coated glass fiber (FIG. 8), of substantially the same thickness, or of greater thickness than the outer diameter of the coated glass fiber (FIG. 7). Any of these configurations of the ribbon matrix material with respect to the coated optical glass fibers may be used with other arrays of fibers, such as those shown in FIGS. 9–11.

The invention is not limited to the ribbon matrix material having a chromophoric indicator as already discussed. In the event it is desired to produce a color-coated ribbon matrix for the optical glass fibers, it will then be appropriate to employ a chromophoric indicator having the characteristic of exhibiting a color which will sufficiently modify the desired ribbon color so as to be readily detected by a shift in the tint or hue of the resulting combination of chromophores under the condition that the chromophoric indicator has received insufficient radiation to induce sufficient shift in the tint or hue thereof.

If a wave-length sensitive device is used to determine whether the color indicator has been bleached (i.e., whether the ribbon matrix material has been completely cured), the device can be used to send a signal to the operator (manual or automated) of the ribbon matrix production line. For example, the wave-length sensitive device can be connected to a controller for the radiation intensity such that when the color indicator is insufficiently bleached, the radiation intensity can be adjusted by the wave-length sensitive device to provide the level of bleaching desired. Alternatively, by connecting the wave-length sensitive device to a controller for the line speed of the ribbon matrix production line, the wave-length sensitive device can signal an adjustment of the line speed to the maximum speed which will still achieve a complete cure.

The coated optical glass fibers made according to this invention can be used to make cable structures and for telecommunication systems. Such telecommunication systems typically include cables containing optical glass fibers, transmitters, receivers, and switches. The cables containing ribbons or bundles of optical glass fibers are the fundamental connecting units of telecommunication systems.

The ribbons or bundles of coated optical glass fibers made according to this invention can be adapted for enclosure within a cable structure. The cable structure can be buried under ground or water for long distance connections, such as between cities. Alternatively, the ribbons or bundles of coated optical glass fibers can be adapted for use in local area networks, such as for connecting offices in high rise buildings, residential subdivisions, and the like.

The present invention will be further described by the following non-limiting example.

EXAMPLE 1 wt % of Reactint X38 Orange (Milliken Chemicals) was added to the following composition:

40–60 wt % urethane acrylate oligomer;
35–55 wt % mono functional acrylate;
2–4 wt % photoinitiator; and
0.75–1.5 wt % additive.

The critical dose of radiation $D_c$ for the composition is 1.0 Joule/cm$^2$.

The mixture was exposed to 1.0 Joule/cm² of UV radiation. The orange color was not completely bleached at this radiation level. Therefore, the composition was then exposed to another 1.0 Joule/cm², which completely bleached the orange dye.

While the invention has been described in detail with respect to certain embodiments thereof, variations and modifications may be made without departing from the spirit and scope of the invention.

What is claimed is:

1. A radiation-curable cross-linked ribbon matrix material for covering an array of coated optical glass fibers, comprising:
    at least one radiation-curable oligomer or monomer;
    at least one chromophoric indicator selected so as to be susceptible to destruction of its chromophoric characteristic upon exposure to radiation and present in an amount which becomes substantially colorless when exposed to a level of radiation sufficient to cure said radiation-curable matrix material;
    wherein said at least one chromophoric indicator has a color that is distinguishable from a base color of said radiation-curable matrix material in cured form; and
    wherein said chromophoric indicator comprises a polymeric dye having a backbone that is capable of becoming entangled within or reacted with said matrix material.

2. A ribbon matrix material according to claim 1, wherein said polymeric dye contains at least one radiation-curable functional group.

3. A ribbon matrix material according to claim 1, wherein said polymeric dye has a molecular weight of between about 1000 and about 2500.

4. A ribbon matrix material according to claim 1, wherein said polymeric dye has a molecular weight of between about 1200 and about 2200.

5. A ribbon matrix material according to claim 1, wherein said chromophoric indicator is present in an amount of between about 0.5 and about 5 wt. %, based on the total weight of the ribbon matrix material.

6. A ribbon matrix material according to claim 1, wherein said chromophoric indicator is present in an amount of between about 0.1 and about 2 wt. %, based on the total weight of the ribbon matrix material.

7. A ribbon assembly of an array of coated optical glass fibers comprising:
    an array of optical glass fibers; and
    at least one radiation-cured cross-linked ribbon matrix material containing a bleached chromophoric indicator, said at least one radiation-cured ribbon matrix material being formulated from a radiation-curable, cross-linkable ribbon matrix material comprising:
    at least one radiation-curable oligomer or monomer;
    at least one chromophoric indicator in an amount which becomes substantially colorless when exposed to an amount of radiation suitable for curing said radiation-curable ribbon matrix material, wherein said at least one chromophoric indicator has a color that is distinguishable from a base color of said radiation-cured ribbon matrix material; and
    wherein said chromophoric indicator comprises a polymeric dye having a backbone that is capable of becoming entangled within or reacted with said cross-linked ribbon matrix material.

8. A ribbon assembly according to claim 7, wherein said polymeric dye contains at least one radiation-curable functional group.

9. A ribbon assembly according to claim 7, wherein said polymeric dye has a molecular weight of between about 1000 and about 2500.

10. A ribbon assembly according to claim 7, wherein said polymeric dye has a molecular weight of between about 1200 and about 2200.

11. A ribbon assembly according to claim 7, wherein said chromophoric indicator is present in an amount of between about 0.05 and about 5 wt. %, based on the total weight of the ribbon matrix material.

12. A ribbon assembly according to claim 7, wherein said chromophoric indicator is present in an amount of between about 0.1 and about 2 wt. %, based on the total weight of the ribbon matrix material.

13. A ribbon assembly according to claim 7 wherein the ribbon assembly is edge-bonded.

14. A ribbon assembly according to claim 7 wherein the ribbon assembly has a substantially circular cross-section.

15. A ribbon assembly according to claim 7 wherein the assembly has a substantially rectilinear cross-section.

16. A ribbon assembly according to claim 7 wherein the assembly has a substantially trapezoid cross-section.

17. An optical glass fiber cable structure comprising;
    (1) at least one coated optical glass fiber; and
    (2) a sheath covering said at least one coated optical glass fiber, said sheath comprising a radiation-cured, cross-linked matrix material containing a bleached chromophoric indicator, said matrix material being formulated from a composition comprising:
        (i) at least one radiation-curable oligomer or monomer; and
        (ii) at least one chromophoric indicator in an amount which becomes substantially colorless when exposed to an amount of radiation suitable for curing said radiation-curable matrix material, wherein said at least one chromophoric indicator has a color which is distinguishable from a base color of said radiation-cured matrix material; and
        wherein said chromophoric indicator comprises a polymeric dye having a backbone that is capable of becoming entangled within or reacted with said cross-linked matrix material.

18. A cable structure according to claim 17 wherein said chromophoric indicator comprises a polymeric dye.

19. A telecommunications system comprising:
    an array of coated optical glass fibers coated with at least one radiation-cured, cross-linked matrix material coating being formulated from a radiation-curable, cross-linkable matrix material comprising:
    at least one radiation-curable oligomer or monomer; and
    at least one chromophoric indicator in an amount which becomes substantially colorless when exposed to an amount of radiation suitable for curing said radiation-curable, cross-linkable coating composition, wherein said at least one chromophoric indicator has a color which is distinguishable from a base color of said radiation-cured matrix material; and
    wherein said chromophoric indicator comprises a polymeric dye having a backbone that is capable of becoming entangled within or reacted with said cross-linked matrix material.

* * * * *